Nov. 28, 1933.  T. C. McKINLEY ET AL  1,937,390
CONTINUOUS TANK FURNACE
Filed Feb. 26, 1923    2 Sheets-Sheet 1
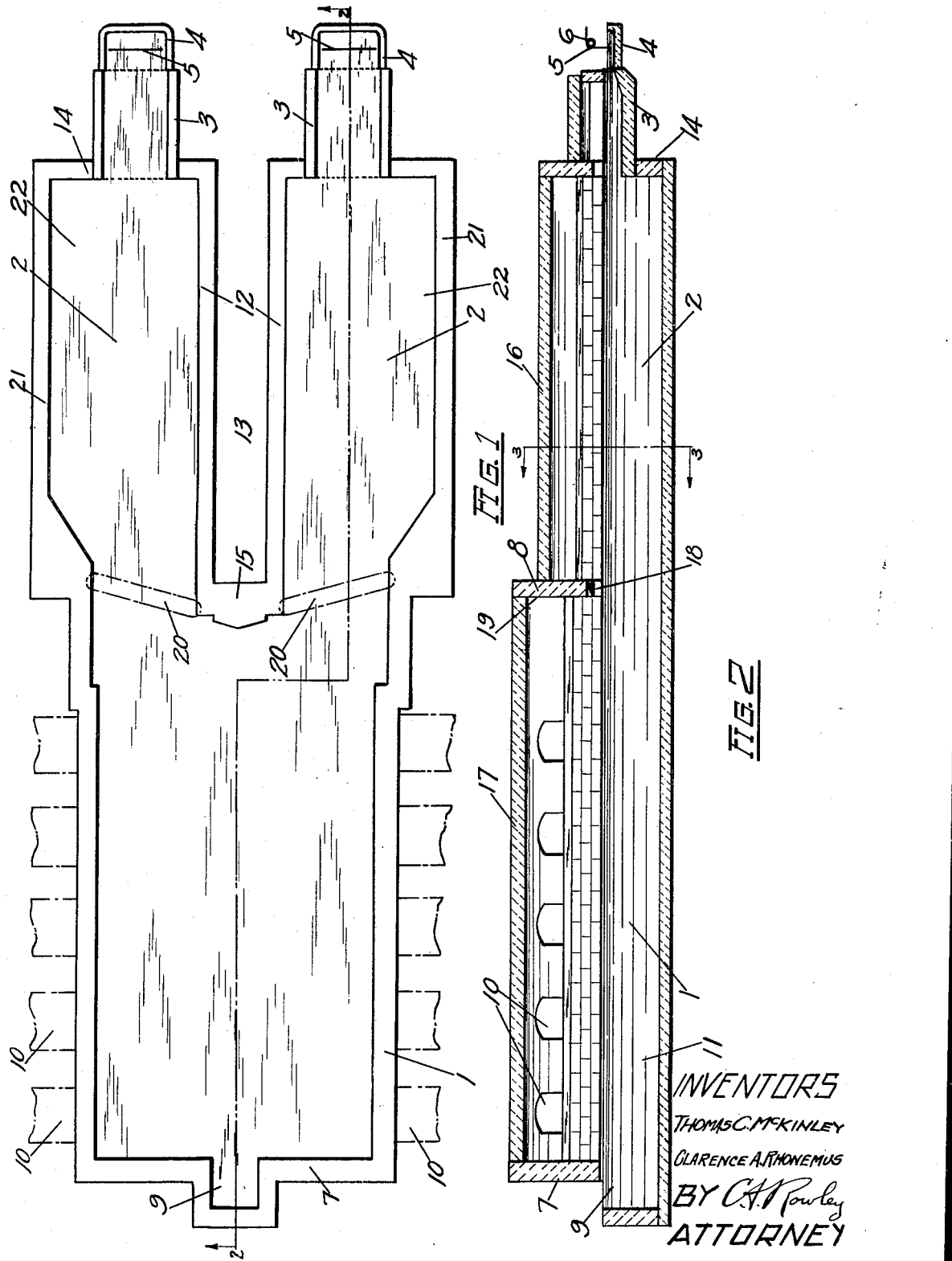

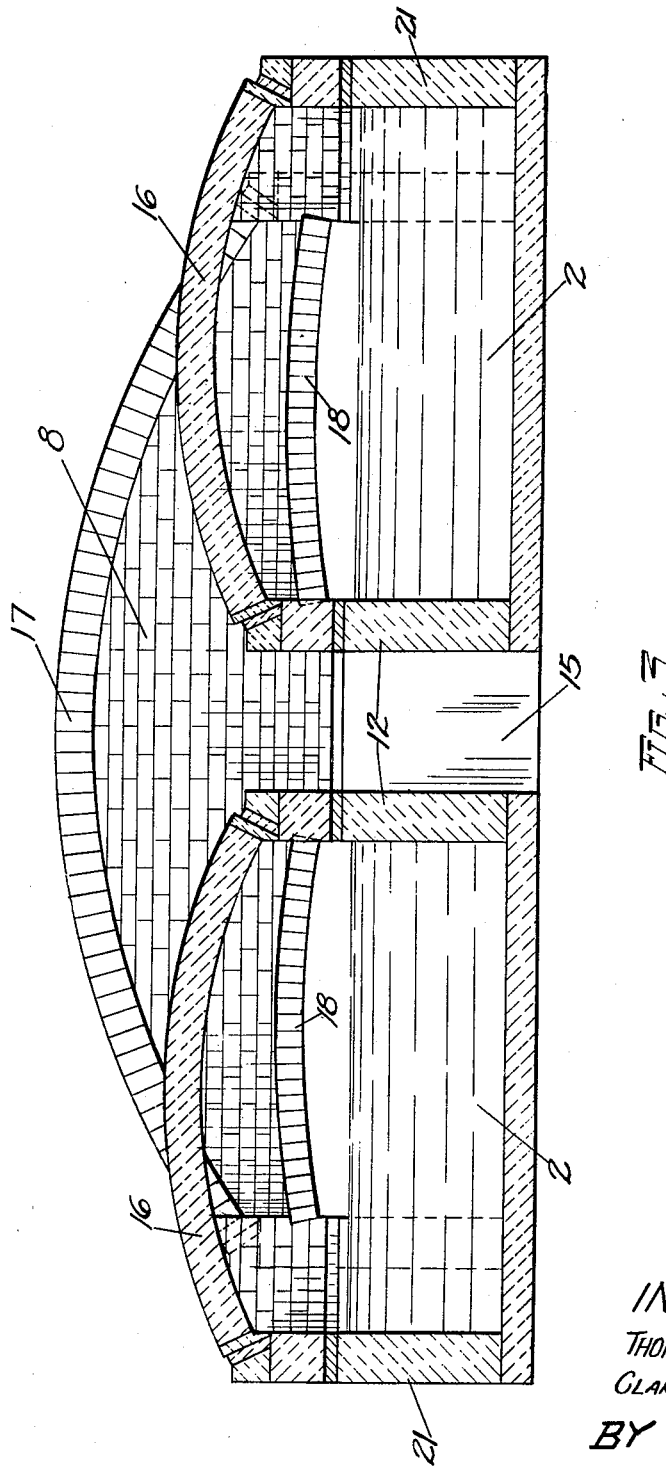

Patented Nov. 28, 1933

1,937,390

UNITED STATES PATENT OFFICE 1,937,390

CONTINUOUS TANK FURNACE

Thomas C. McKinley and Clarence A. Rhonemus, Charleston, W. Va., assignors to Libbey-Owens-Ford Glass Company, Toledo, Ohio, a corporation of Ohio Application February 26, 1923. Serial No. 621,139

24 Claims. (Cl. 49—54)

This invention relates to improvements in continuous tank furnaces, and more particularly to such a furnace designed to furnish molten glass simultaneously to a plurality of sheet glass drawing machines.

In the process of drawing sheet glass, it has been customary to provide a separate glass melting unit for each sheet drawing machine. This unit would consist of an elongated tank furnace, comprising melting, refining and cooling chambers. The glass producing materials are fed into the melting end of the furnace, where intense heat is applied and the materials fused into molten glass. This molten glass flows slowly through the refining and cooling chambers, wherein it settles and cools until it has acquired the proper homogeniety and plasticity to be drawn into sheet form. A very careful and prolonged treatment of the molten glass is required to secure the nearly perfect quality necessary for producing clear and uniform sheets of glass. A very large quantity of glass must be maintained in molten condition in this tank, and the cost of melting and subsequently heating this glass is considerable.

It has long been realized that it would be more economical to supply two or more machines from a single furnace, since a relatively small increase in the size of the tank, and the fuel consumption, would enlarge its capacity sufficiently to supply the extra machine. However, attempts to feed two machines from spaced points at the end of the cooling or refining chambers have proven unsuccessful. The molten glass would not feed uniformly to the two edges of the sheet in either machine, and the sheets would be warped and of poor and uneven quality. This was largely due to the necessarily unequal temperature and flow conditions existing at the sides and center of a tank. The glass adjacent the tank walls will be cooled and frictionally retarded. The outside portion of the sheet in each machine would be fed from these side flows whereas the inner portion, that is the side nearer the other machine, would be fed from the hotter, more freely flowing glass, at the center of the tank. Also, some portion of this central glass flow is stopped or retarded by the division wall at the end of the tank between the two machines. This glass becomes dormant or stagnant, and deteriorates in quality, thus adversely affecting the sheet when it finally is drawn thereinto. For these, and other reasons not completely understood, it was impossible to obtain high quality sheets of glass on the machines when supplied from this type of furnace.

The present invention overcomes the difficulties indicated above, and discloses a system whereby a plurality of machines may be successfully fed from a single furnace unit. The invention comprises changes in the structure of the tank itself, whereby practically the entire cooling and refining portions of the furnace are split up into a series of separate channels, one for each machine. Each channel is a prolongation of a portion of the common melting tank, but the channel is quite distinct in itself from each of the other channels, having its own walls and cover arch. In this way the glass at both sides of the channel will meet with the same temperature conditions and frictional retardation, and both sides of the sheet in the machine will be fed uniformly and equally. The entire furnace unit combines the economies of a single melting tank, with the advantages of separate refining and cooling tanks for each machine. The molten glass from the melting chamber flows without material interruption directly into the individual channels. In each channel the glass flows directly and evenly to its particular machine, practically the entire refining and cooling process being performed individually for each machine.

Advantage is taken of the relatively small widths of the several channels, to make radical and advantageous advances in the temperature control system. The cover arches over the channels are dropped much lower than the cover arch over the melting tank. The division wall thus necessitated adjacent the entrance of the channels acts to restrict the flow of heated gases from the melting chamber into the several refining chambers or channels. This wall may be extended down nearly to the glass level, and serves not only to confine the heated gases to the melting chamber, but also reflects and radiates the heat directed thereagainst back into the melting chamber, increasing the melting efficiency of this chamber. Since this wall does not extend down into the flowing glass, it has no impeding effect on this flow. There is nothing to stop the free and uninterrupted flow of the glass from the melting point until it reaches the machines, except the division wall between each pair of channels. This retarding effect, being confined to the melting chamber where the heat is intense, is not serious, as any stagnant or dormant glass will be melted out before it flows into the channels.

Other objects and advantages of this invention will become apparent from the following detailed description of one approved embodiment thereof. In the accompanying drawings:

Fig. 1 is a plan view of the lower glass-holding portion of the furnace unit, the upper side walls and cover arches being removed.

Fig. 2 is a vertical longitudinal section through the tanks, taken substantially on the line 2—2 of Fig. 1.

Fig. 3 is a transverse vertical section on an enlarged scale taken substantially on the line 3—3 of Fig. 2.

The melting tank is shown at 1, the two refining tanks or channels at 2, and the cooling chambers at 3. As here illustrated, the furnace is feeding molten glass to two sheet-glass drawing machines of the well-known Colburn type, as disclosed in the patent to Colburn, 1,248,809, granted Dec. 4, 1917. The glass flows out from the cooling chamber into a shallow open draw-pot 4, from which the glass sheet 5 is drawn upwardly and bent into the horizontal plane over a bending member 6. Obviously, this is merely illustrative of one use of this furnace, which might also furnish molten glass for other types of sheet-drawing machines, or even for machines producing other forms of glass articles. The furnace is particularly designed however for use with sheet-glass drawing machines, where it is essential that a uniform, evenly-tensioned flow of homogeneous glass of high quality be delivered to the machine, in order to produce the best quality of sheet glass.

That portion 1 of the furnace between the front wall 7 and the intermediate wall 8 is referred to as the melting tank, and is constructed much the same as previous tanks of this type for supplying a single machine, except that it is of somewhat greater dimensions. The glass producing materials, known as batch or cullet, are fed into the tank through the extension or dog-house 9, and these materials are melted by the heated gases furnished by the regenerators 10. Five pairs of these regenerators are indicated in the drawings but this number is merely illustrative, and sometimes fire is not maintained in all of the regenerators with which the furnace is provided. Sufficient heat is furnished to melt the materials, (which melting process takes place mostly in the forward portion 11 of tank 1), and to maintain the melted pool of glass in the tank at the desired temperature.

The molten glass flows slowly from the tank 1, through the rear portion of the furnace where the refining and cooling of the glass takes place. This rear portion of the furnace, is divided into duplicate or twin tanks by the spaced vertical walls 12, with intervening open space 13. These walls 12 extend from the rear ends 14 of the refining tanks or channels to points beneath the intermediate wall 8, where they are joined by vertical wall 15. It will be noted from Fig. 2 that the bottoms of tanks 1 and 2 are continuous prolongations of one another so that the molten glass has an unbroken flow from the melting tank to and through the refining tanks. The cooling chambers 3, as in former practice, are of considerably less depth than the melting and refining chambers, so that only the refined surface strata of the glass flow on through the cooling chambers to the draw-pots 4.

The cover arches 16 for the channels 2 are dropped considerably lower than the cover arch 17 of the melting tank, the intermediate wall 8 closing the space therebetween down to the tank wall 15. Preferably, this wall 8 will be extended down to jack-arches 18 closely above the surface of the molten glass. In this way, the heating chamber above the molten glass in the melting tank is practically cut off from the channels 2, and the heating gases will be largely confined to the melting chamber where a much higher temperature is desired. Furthermore, the inner face 19 of the wall 8 will reflect and radiate heat back onto the glass in the melting chamber 1, thus increasing the melting efficiency of this tank.

If preferred, floaters 20, (indicated in dotted lines in Figure 1), may be positioned in the melting chamber 1 adjacent the entrance of the channels 2, to skim off any scum or unmelted materials on the surface glass. However, it has been found that the tanks operate very efficiently without these floaters, and as the presence of any foreign bodies in the molten glass always tends to injure the glass, it is questionable whether the benefits derived from skimming the glass are not more than offset by the lines and blemishes imparted by the floaters themselves. The use of such floaters is optional.

After the molten glass has passed into the refining tank or channel 2, it slowly flows therethrough and through the cooling chamber 3 to the draw-pot 4, much the same as in the similar portions of a single unit installation. The inner side walls 12 will offer substantially the same frictional resistance to the flowing glass as the outer walls 21.

The radiation between the closely adjacent walls 12, will maintain these inner walls and the molten glass adjacent thereto at a somewhat higher temperature than the outer walls 21 and the glass 22 at the outer sides of the streams. It will be noted that the outer wall 21 of each channel is set out somewhat beyond the line of the side wall of melting tank 1, thus slightly extending the outer portion 22 of the stream of glass moving toward the cooling chamber. Thus the outer side of the stream flowing into the cooling chamber will draw from a line which is somewhat removed from the outer wall 21, and has a temperature substantially the same as that at the inner side of the stream adjacent inner wall 12. Thus the molten glass will be delivered to the two sides of the source of sheet 5, at uniform rates and at uniform temperatures, and the sheet 5 will pull smoothly and evenly, as if it were fed from the central flow of a single tank.

From the above, it will be seen that the rear portion of this furnace unit functions much the same and has all of the advantages of a pair of separate independent tanks, one for each machine. The refining and cooling process is practically individual to each machine. However, the expensive melting process is carried out in a single tank of somewhat increased capacity. The fuel consumption of the enlarged melting tank is not much greater than that of the ordinary tank required for melting glass for a single machine. This fuel efficiency is also increased by the intermediate radiating wall 8, as above described. Also, the installation cost of one of these double machine units is much less than the cost of two single furnace units, and obviously the concentration and elimination of parts will greatly decrease the factory overhead and labor costs.

While an installation has been described, by way of example, designed for two machines, by obvious changes it could be adapted for three or more machines.

Applicants are aware that single furnace units have already been designed and used for supplying a plurality of glass-gathering holes for "hand-plants" for blowing glass-cylinders, also for supplying a plurality of mechanical glass-blowing machines. The use of a single glass supply channel from which a series of sheet-glass drawing machines, are fed, the glass being reheated between each pair of machines has also been proposed. None of these prior devices, however either disclose or suggest the construction or method of flowing glass, presented in this application, and the several advantages of this invention as described above were neither contemplated nor obtained in any of these old furnaces.

We claim:

1. The method of providing molten glass for a plurality of sheet glass drawing machines, consisting in melting the glass-forming materials in a single pool, flowing the molten glass therefrom in separate streams, one to each machine, maintaining a melting heat above the pool but shielding the streams from this heat, and separately refining and cooling the glass in each stream to the proper working condition.

2. A tank furnace for supplying molten glass to sheet-glass drawing machines, comprising a continuous elongated tank consisting of melting, refining and cooling chambers, the molten glass flowing freely from the melting chamber to and through the refining and cooling chambers to the machine, the cover arch for the refining chamber being much lower than the cover arch for the melting chamber, and a division wall between the melting and refining chambers extending from the cover arches approximately down to the glass level.

3. A continuous tank furnace for supplying molten glass to a plurality of sheet-glass drawing machines, the tank comprising a melting end and a refining and cooling end from which the machines are supplied, substantially the entire refining and cooling portions being divided into a series of separate channels, one for each machine, each channel having individual walls and cover arches, and an intermediate division wall between the melting and refining chambers extending from the cover arches approximately to the glass level.

4. A continuous tank furnace for supplying molten glass to a plurality of sheet-glass drawing machines, the tank comprising a melting end and a refining and cooling end from which the machines are supplied, substantially the entire refining and cooling portions being divided into a series of separate channels, one for each machine, each channel having individual walls and cover arches, the cover arches for the channels being considerably lower than the cover arch for the melting chamber, and an intermediate division wall between the melting and refining chambers extending from the cover arches approximately to the glass level.

5. A continuous tank furnace for supplying molten glass to a plurality of sheet-glass drawing machines, the tank comprising a melting end and a refining and cooling end from which the machines are supplied, substantially the entire refining and cooling portions being divided into a series of separate channels, one for each machine, each channel having individual walls and cover arches, and intermediate means between the melting and refining chambers to restrict the flow of heated gases to the refining chamber without impeding the flow of the molten glass.

6. A continuous tank furnace for supplying molten glass to a pair of sheet glass drawing machines, the furnace comprising a melting tank, a pair of separate parallel refining tanks through which the molten glass flows from the melting tank, and a pair of cooling chambers through which the glass flows from the refining tanks, the entrances to the cooling chambers being closer to the adjacent inner side walls of the refining tanks than to the outer side walls thereof.

7. A continuous tank furnace for supplying molten glass to a plurality of sheet glass drawing machines, the tank comprising a melting end and a refining and cooling end from which the machines are supplied, substantially the entire refining and cooling portions being divided into a series of separate channels, one for each machine, each channel having individual walls and cover-arches, said refining channels being offset along their outer edges in and for the manner specified.

8. A tank furnace for supplying molten glass to sheet glass drawing machines, comprising a continuous elongated tank, consisting of a melting chamber, refining chambers and cooling chambers, the molten glass flowing freely from the melting chamber to and through the refining and cooling chambers to the machine, the cover-arch for the refining chamber being much lower than the cover-arch for the melting chamber, and a division wall between the melting and refining chambers extending from the cover-arches approximately down to the glass level, said refining chambers having offset portions at the outer edges thereof to equalize the temperature conditions of the glass therein.

9. A continuous tank furnace for supplying molten glass to a plurality of sheet glass drawing machines, the tank comprising a melting end and a refining and cooling end from which the machines are supplied, substantially the entire refining and cooling portions being divided into two separate cooling chambers, one for each machine, said cooling chambers being in offset relation with respect to the refining chambers toward the center of the melting tank thereof.

10. In a furnace construction, a single elongated melting tank in which the molten glass is produced, a pair of spaced substantially parallel refining tanks connected to one end of the melting tank and extending forwardly therefrom in the same general direction, said refining tanks and melting tank being positioned at the same level with the bottoms thereof being continuous prolongations of one another, a relatively shallower and narrower cooling chamber connected to the forward end of each refining tank and extending forwardly in the same direction, and a shallower working receptacle connected to and in communication with the forward end of each cooling chamber.

11. In a furnace construction, a single melting tank in which molten glass is produced, a plurality of refining tanks connected to one end thereof and extending in the same general direction therefrom, said refining tanks being independent and in spaced parallel relation with respect to one another, a cooling chamber connected to the forward end of each refining tank, and a working receptacle connected to the forward end of each cooling chamber, said refining tanks, cooling chambers and working receptacles being in substantial alignment with one another and with said melting tank to constitute substantial continuations of the latter so that the glass is caused to flow in separate substantially straight unbroken paths from the melting tank through said refining tanks and cooling chambers into said working receptacles, each working receptacle receiving glass from its respective refining tank and cooling chamber only.

12. In sheet glass apparatus, a single melting tank in which molten glass is produced, a plurality of refining tanks connected to one end thereof and extending in the same general direction therefrom, said refining tanks being independent and in spaced parallel relation with respect to one another, a cooling chamber connected to the forward end of each refining tank, a working receptacle connected to the forward end of each cooling chamber, said refining tanks, cooling chambers and working receptacles being in substantial alignment with one another and with said melting tank to constitute substantial continuations of the latter so that the glass is caused to flow in separate substantially straight unbroken paths from the melting tank through said refining tanks and cooling chambers into said working receptacles, each working receptacle receiving glass from its respective refining tank and cooling chamber only, and means associated with each working receptacle for forming a sheet of glass therefrom, said sheet extending transversely of said receptacle and also transversely of the flow of glass thereinto.

13. In a furnace construction, a single melting tank in which molten glass is produced, a plurality of refining tanks connected to one end thereof and extending forwardly therefrom in substantial alignment therewith, a cooling chamber connected to the forward end of each refining tank, and a working receptacle connected to the forward end of each cooling chamber, each working receptacle receiving glass from its respective refining and cooling chamber only, said refining tanks, cooling chambers and working receptacles being in substantial alignment with one another so that the glass is caused to flow therethrough in separate substantially straight unbroken paths.

14. In sheet glass apparatus, a single melting tank in which molten glass is produced, a plurality of refining tanks connected to one end thereof and extending forwardly therefrom in substantial alignment therewith, a cooling chamber connected to the forward end of each refining tank, a working receptacle connected to the forward end of each cooling chamber, each working receptacle receiving glass from its respective refining and cooling chamber only, said refining tanks, cooling chambers and working receptacles being in substantial alignment with one another so that the glass is caused to flow therethrough in separate substantially straight unbroken paths, and means associated with each working receptacle for forming a sheet of glass therefrom, said sheet extending transversely of said receptacle and also transversely of the line of flow of glass thereinto.

15. A continuous tank furnace for supplying molten glass to a pair of sheet glass forming machines, comprising a melting tank, a pair of parallel refining tanks, passages connecting the discharge end of the melting tank with the receiving ends of the refining tanks, and cooling chambers connected to said refining tanks, the center lines of the passages being closer together than the center lines of the refining tanks and the center lines of the cooling chambers being further apart than the center lines of said passages but closer together than the center lines of said refining tanks.

16. In a furnace construction, a single melting tank in which molten glass is produced, a plurality of refining tanks connected to one end thereof and extending in the same general direction therefrom, said refining tanks being independent and in spaced parallel relation with respect to one another, a relatively shallower and narrower cooling chamber connected to the forward end of each refining tank, and a relatively shallower working receptacle connected to and in communication with the forward end of each cooling chamber, said refining tanks, cooling chambers and working receptacles being in substantial alignment with one another and with said melting tank to constitute substantial continuations of the latter so that the glass is caused to flow in separate substantially straight unbroken paths from the melting tank through said refining tanks and cooling chambers into said working receptacles, each working receptacle receiving glass from its respective refining tank and cooling chamber only.

17. In a furnace construction, a single melting tank in which molten glass is produced, a pair of spaced substantially parallel refining tanks connected to one end of the melting tank and extending forwardly therefrom in the same general direction, a relatively shallower cooling chamber connected to the forward end of each refining tank, and a working receptacle connected to the forward end of each cooling chamber, each working receptacle receiving glass from its respective refining tank and cooling chamber only, said refining tanks, cooling chambers, and working receptacles being in substantial alignment with one another so that the glass is caused to flow therethrough in separate substantially straight unbroken paths.

18. In a furnace construction, a single melting tank in which molten glass is produced, a pair of spaced substantially parallel refining tanks connected to one end of the melting tank and extending forwardly therefrom in the same general direction, a cooling chamber connected to the forward end of each refining tank, and a working receptacle connected to the forward end of each cooling chamber, said receptacle being relatively shallower than the refining tank, each working receptacle receiving glass from its respective refining tank and cooling chamber only, said refining tanks, cooling chambers and working receptacles being in substantial alignment with one another so that the glass is caused to flow therethrough in separate substantially straight unbroken paths.

19. In a furnace construction, a single melting tank in which molten glass is produced, a pair of spaced substantially parallel refining tanks connected to one end of the melting tank and extending forwardly therefrom in the same general direction, a relatively shallower cooling chamber connected to the forward end of each refining tank, and a relatively shallower working receptacle connected to the forward end of each cooling chamber, each working receptacle receiving glass from its respective refining tank and cooling chamber only, said refining tanks, cooling chambers and working receptacles being in substantial alignment with one another so that the glass is caused to flow therethrough in separate substantially straight unbroken paths.

20. In a furnace construction, a single melting tank in which molten glass is produced, a pair of spaced substantially parallel refining tanks connected to one end of the melting tank and extending forwardly therefrom in the same general direction, a relatively narrower cooling chamber connected to the forward end of each refining tank, and a working receptacle connected to the forward end of each cooling chamber, each working receptacle receiving glass from its respective refining tank and cooling chamber only, said refining tanks, cooling chambers, and working receptacles being in substantial alignment with one another so that the glass is caused to flow therethrough in separate substantially straight unbroken paths.

21. In a furnace construction, a single melting tank in which molten glass is produced, a pair of spaced substantially parallel refining tanks connected to one end of the melting tank and extending forwardly therefrom in the same general direction, a cooling chamber connected to the forward end of each refining tank, and a working receptacle connected to the forward end of each cooling chamber, said receptacle being relatively narrower than said refining tank, each working receptacle receiving glass from its respective refining tank and cooling chamber only, said refining tanks, cooling chambers and working receptacles being in substantial alignment with one another so that the glass is caused to flow therethrough in separate substantially straight unbroken paths.

22. In a furnace construction, a single melting tank in which molten glass is produced, a pair of spaced substantially parallel refining tanks connected to one end of the melting tank and extending forwardly therefrom in the same general direction, a relatively narrower cooling chamber connected to the forward end of each refining tank, and a relatively narrower working receptacle connected to the forward end of each cooling chamber, each working receptacle receiving glass from its respective refining tank and cooling chamber only, said refining tanks, cooling chambers and working receptacles being in substantial alignment with one another so that the glass is caused to flow therethrough in separate substantially straight unbroken paths.

23. The process of producing molten glass, which consists in melting the glass batch ingredients in a single pool, flowing the molten glass from said pool in a plurality of separate streams through individual refining zones, in independently refining the glass in each stream, in then reducing the width and depth of each stream and flowing the same through a cooling zone into a working zone, and in causing said separate streams of glass to flow through the refining and cooling zones and into said working zones through substantially straight unbroken parallel paths.

24. The process of producing molten glass which consists in melting the glass batch ingredients in a single pool or substantial depth, flowing the molten glass from said pool in a plurality of separate streams through individual refining zones, in independently refining the glass in each stream while maintaining the depth of said stream substantially equal to that of said single pool, in then reducing the width and depth of each stream and flowing the same through a cooling zone, in further reducing the depth of each stream and flowing the same from said cooling zone into a working zone, and in causing said separate streams of glass to flow through the refining and cooling zones and into said working zones through substantially straight unbroken parallel paths.

THOMAS C. McKINLEY.
CLARENCE A. RHONEMUS.